April 15, 1930.  S. BARACATE  1,754,382
SOLDERING TOOL
Filed July 5, 1929
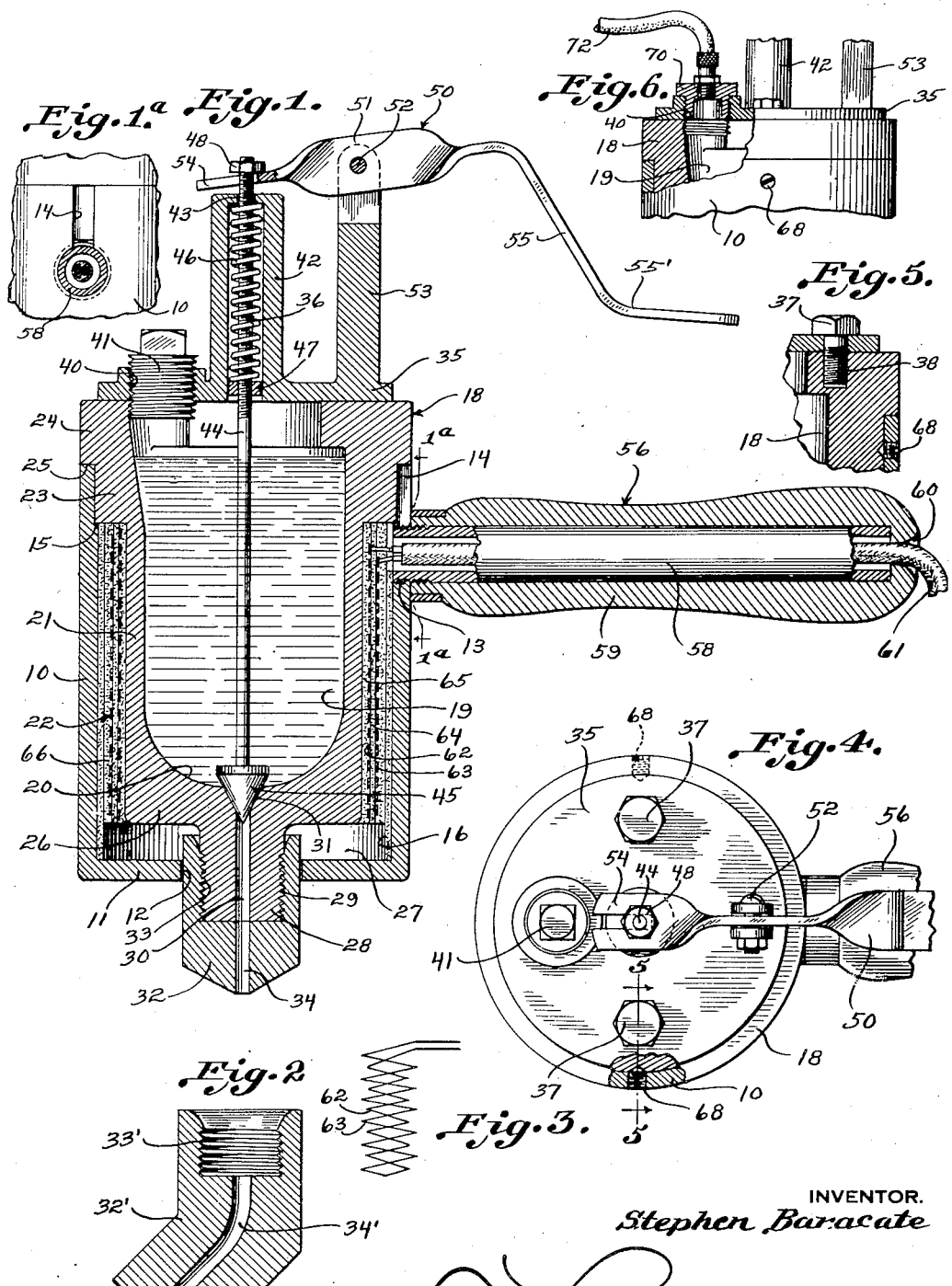
INVENTOR.
Stephen Baracate
BY Lancaster and A. Irvine
ATTORNEYS.

Patented Apr. 15, 1930

1,754,382

UNITED STATES PATENT OFFICE

STEPHEN BARACATE, OF TROY, NEW YORK

SOLDERING TOOL

Application filed July 5, 1929. Serial No. 376,161.

The present invention relates to soldering tools, and the primary object of the invention is to provide a combination melting pot and soldering iron.

A further object of the invention is to provide a combination melting pot and soldering iron embodying control means for controlling the flow of solder through the soldering tip or head.

A further object of the invention is to provide an electrically heated fountain soldering tool embodying novel features of construction permitting of quick and easy assembling and dismembering of the tool.

A further object of the invention is to provide a tool of this character having a melting pot of novel construction permitting interchanging of the soldering tip.

A still further object of the invention is to provide a combination melting pot and soldering iron having a laterally projecting handle, and control means arranged on the upper end of the iron and provided with an operating lever extending to a position to be operated by the hand gripping the handle.

A still further object resides in the novel construction of the heating unit for encircling the solder reservoir, and the formation of the lower portion of the reservoir insuring proper heating of the soldering tip.

Other objects and advantages of the invention will be apparent during the course of the following detailed description, taken in connection with the accompanying drawing, forming a part of this specification, and in which drawing—

Figure 1 is a central vertical section through the improved soldering tool.

Figure 1ª is a fragmentary section on the line 1ª—1ª of Figure 1.

Figure 2 is a section through a form of angular soldering tip for interchangeable connection with the tool.

Figure 3 is a diagrammatic illustration of the arrangement of the heating element.

Figure 4 is a fragmentary top plan view of the tool.

Figure 5 is a fragmentary detail section on the line 5—5 of Figure 4.

Figure 6 is a fragmentary detail view showing the manner in which an air pressure line may be coupled with the solder reservoir.

Referring to the drawing in detail, and wherein similar reference characters designate corresponding parts throughout the several views, the improved soldering tool comprises a cylindrical tubular outer casing or shell 10 closed at its lower ends by a preferably flat bottom wall 11 having an axially disposed circular opening 12. The casing or shell 10 is preferably formed from metal, and provided in the cylindrical wall of the shell adjacent its upper end is a screw threaded opening 13 into the upper side of which a slot 14 opens and extends to the upper edge of the casing. The upper end of the cylindrical casing wall is slightly enlarged above the opening 13 providing an internal annular shoulder 15, and below the shoulder 15 the casing is provided with an insulating lining 16 extending from the shoulder 15 to the bottom wall 11.

Adapted for removable insertion into the upper open end of the casing 10 is a metallic melting pot or cup 18 in which the solder is intended to be melted. This melting pot or cup 18 forming a container or reservoir for the solder is formed with a chamber 19 being open at its upper end and preferably having a rounded bottom 20 causing flow of the melted solder into the center of the chamber. The body portion 21 of the cup is of cylindrical formation and of less diameter than the internal diameter of the lining 16 providing an annular space for accommodating an electric heating unit 22 adapted to encircle the body portion 21.

At the upper end of the body portion 21 the cup 18 is enlarged in diameter as at 23 providing a bearing portion with an external diameter equal to the internal diameter of the cylindrical casing wall above the shoulder 15. This bearing portion 23 serves to prevent any possible lateral shifting of the melting cup within the casing 10, such as would have an injurious effect upon the heating unit 22. Above the bearing portion 23 the upper end of the cup is provided with a stop rim 24 forming an external annular shoulder 25 for seating engagement upon the upper end of the casing 10 and limiting downward movement of the melting cup. The bottom wall 26 of the melting pot is formed relatively thick and is preferably provided with a flat bottom surface which when the melting pot is inserted for its proper depth into the casing 10 is spaced above the bottom casing wall 11 forming a chamber or air space 27.

Formed axially of the lower end of the melting cup 18 is a cylindrical boss or extension 28 being externally screw threaded at its lower end as at 29. This boss or extension 28 is of less diameter than the diameter of the opening 12 provided in the casing bottom wall 11 and is of such length as to project through the opening 12 and below the bottom wall 11 when the cup is in position within the casing 10. Formed axially through the extension 28 is a feed duct 30 which opens into the lower end of the chamber 19 and has its upper end flared to provide a tapering seat 31.

This boss or extension 28 provides a coupling extension for the soldering tip or head 32 provided with an internally threaded socket 33 for threaded connection with the screw threads 29. The socket or sleeve portion 33, when the soldering tip is connected to the extension 28 extends inwardly through the opening 12 into the space 27 and the external diameter of the socket portion is less than the diameter of the opening 12 so that a slight space is formed between the soldering tip and bottom wall 11. The soldering tip is provided with a feed duct 34 which communicates with the feed duct 30 to allow free passage of the solder from the chamber 19 to the working surface of the soldering tip. The soldering tip is preferably formed from copper and may be of any suitable size in accordance with the particular nature of the work to be done.

In Figure 2 the soldering tip or head 32' illustrated as of angular formation and has an angular duct 34' formed therethrough connecting the working surface of the tip with the internally threaded socket 33'. It will be readily apparent how the soldering tips 32 and 32' may be interchangeably coupled to the extension 28.

The upper open end of the melting pot or cup 18 is closed by a flat cover plate or lid 35 adapted to rest upon the flat upper end of the cup, and this cover plate or lid forms a mounting for the control means 36 for controlling flow of the melted solder through the feed duct 30. The cover plate 35 is secured to the melting cup preferably by stud bolts 37 extended through the plate and threaded into pockets 38. The cover plate 35 is provided adjacent one edge with a threaded filler opening 40 for removably receiving a threaded closure plug 41. This filler opening 40 allows for filling of the chamber 19 upon removal of the plug 41.

Referring now to the specific construction of the control means 36, the cover plate 35 is formed at its axial center with a tubular guide extension 42 having its lower end opening into the chamber 19 and having an inturned annular shoulder 43 at its upper end forming a reduced opening thru the upper end of the tube. Reciprocably mounted in the tube 42 is a valve stem 44 having a threaded upper end portion projecting above the upper end of the tube and provided at its lower end with a conically shaped valve 45 for engagement with the conically shaped seat 31 provided at the inner end of the feed duct 30. Arranged in the tubular guide extension 42 and encircling the valve stem 44 is an expansion coil spring 46 having its upper end bearing against the inturned annular shoulder 43 and having its lower end acting upon an adjusting nut 47 threaded upon the valve stem and having guided movement in the extension. This spring 46 acts to normally seat the valve 45 and adjustment of the nut 47 will vary the tension of the spring 46 to vary the pressure with which the valve engages the seat 31. Threaded upon the upper extremity of the valve stem 44 is a lever position adjusting nut 48 for adjusting the position of the control lever 50.

The control lever 50 may be formed from a flat strip of metal having a flat pivot portion 51 pivotally mounted on the pivot pin 52 in the upper end of a bracket arm 53 preferably cast integral with the cover plate 35. The lever forwardly of the pivot portion 51 is twisted through 90° and bifurcated to provide a forked end 54 through which the upper end of the valve stem 44 projects with the nut 48 resting upon the upper side of the forked end. The rear end portion of the lever 50 is bent downwardly from the pivot portion 51 to provide a thumb grip portion 55 having its lower end 55' extending in substantially parallel relation to a handle 56 projecting radially from the tubular casing 10.

The handle 56 for detachable connection with the casing 10 preferably includes a tubular lining 58 formed of metal and having a screw-threaded forward end for threaded connection into the threaded opening 13. Encircling the metallic tubular lining 58 is a cover 59 formed of a heat insulating material such as wood or the like. The rear or outer end of the cover 59 is provided with an opening 60 whereby a lead wire 61 may be extended through the handle for connection with the heating unit 22.

The heating unit 22 for encircling the body portion 21 of the melting pot or cup 18 preferably consists of a continuous strip of flat resistance wire wound to provide inner and outer concentrically arranged spirals 62 and 63 respectively separated by a thin layer of insulating material 64 and having the upper ends of the spirals suitably connected to the lead wire 61 at the inner end of the hollow handle. A layer of insulation 65 spaces the innermost spiral 62 from the metallic melting cup 18 and a heat insulating cover 66 encircles the outer spiral 63, and this outer covering 66 has surface contact with the heat insulation lining 16. The insulation 66 and insulation lining 16 provide a relatively thick insulating mass between the spirals 62 and 63 and the casing 10 and thus prevents excessive heating of the casing.

The melting pot 18 is removably held within the casing 10 by means of suitable set screws 68 threaded through the upper end portion of the cylindrical casing wall into engagement with the circumference of the bearing portion 23. Removal of the melting pot may readily be accomplished by loosening the set screws 68 and threading the handle 65 from the opening 13 which allows the inner end of the lead conductor 61 to be moved upwardly through the slot 14. The heating unit 22 is affixed to the melting pot so as to be withdrawn from the casing 10 with the cup.

By so having the bottom wall 26 of the melting cup formed relatively thick the extension 28 will be retained relatively hot through conduction and will retain its heat for a considerable period of time after shutting off the current to the heating unit 22. By having the opening 12 of such diameter as to prevent the soldering tip 32 from contacting with the bottom casing wall 11 the bottom casing wall will be prevented from being heated to any great extent, and the air space 27 will also aid to prevent overheating of the bottom wall.

In some instances when it is desirable to speed up flow of the solder from the chamber 19, a bushing 70 as shown in Figure 6 is substituted for the plug 41 and this bushing provides means for attaching an air pressure line 72 whereby a pressure may be created in the chamber 19 for forcing the solder through the feed duct 30 upon opening of the valve 45.

In operation of the device the plug 41 is first removed and a suitable quantity of solder inserted through the opening 40 after which the plug 41 may be replaced. The electric current is then turned on until the solder within the chamber 19 is melted by the heating unit 22 and at the same time heats the soldering tip sufficiently to flow solder on a surface upon which the working surface of the tip is placed. Depression of the thumb grip portion 55 toward the handle 56 will unseat the valve 45 and regulate flow of the solder thru the feed ducts 30 and 34.

From the foregoing description it will be apparent that a novel and improved combination melting pot and soldering iron has been disclosed embodying novel features of construction insuring proper heating of the soldering tip without undue overheating of the outer casing. It will also be apparent that a device of this character has been disclosed which may be easily handled and flow of the solder readily controlled. It will also be apparent that a novel construction has been disclosed which will be strong and durable and permitting of ready and easy assembling and dismembering of the device.

Changes in detail may be made to the form of invention herein shown and described, without departing from the spirit of the invention or the scope of the following claims.

I claim:

1. A soldering tool comprising an outer casing being open at its upper end and having a flat bottom wall provided with an axial opening, a melting pot slidably fitting into the upper open end of the casing with its flat bottom wall in spaced relation above the casing bottom wall and having an integral coupling extension provided with a feed duct, extending downwardly through the opening in the bottom casing wall, a soldering tip carried by the coupling extension and having a duct communicating with the feed duct, a heating element encircling the pot within the casing, a handle connected to the casing, and valve means controlling said feed ducts.

2. A soldering tool comprising an outer casing having an open upper end, a melting pot removably fitting in the open upper end of the casing and having a feed duct in its lower end, a control valve for the feed duct, a soldering tip carried by the lower end of the pot and having a duct communicating with the feed duct, a heating element encircling the pot within the casing, a cover plate closing the upper end of the pot and having a filler opening, valve control means carried by the cover-plate embodying a pivoted thumb lever, and a handle connected to the casing and projecting laterally therefrom beneath the thumb lever.

3. In a soldering tool the combination of an outer casing being open at its upper end and having an axially disposed opening in the bottom wall, a melting pot removably fitting in the upper open end of the casing and having an axial extension at its lower end projecting thru the opening in the bottom casing wall, said extension having a feed duct formed therethrough, means supporting the pot with its lower end spaced above the casing bottom wall, a heating element encircling the pot within the casing, a soldering tip connected to said extension and projecting inwardly through the opening in the bottom casing wall and out of contact with the wall, said tip having a duct communicating with said feed duct, and valve means for controlling the flow of solder through said feed ducts.

4. In a soldering tool the combination of an electrically heated melting pot having a feed duct opening through its bottom and having a conical seat at its inner end, a cover plate connected to the upper end of the pot and provided with a filler opening, a tubular guide extension projecting upwardly from the cover plate and having an inturned annular shoulder at its upper end, a valve stem reciprocably guided in the guide extension, a valve carried by the lower end of the stem for engagement upon said seat of the feed duct, an adjusting nut on the valve stem, an expansion coil spring encircling the valve stem between the adjusting nut and the annular shoulder, said valve stem having its upper end projecting above the tubular guide extension, a nut threaded upon the upper end of the valve stem, a bracket arm carried by the cover plate, and a thumb control lever pivotally mounted intermediate its ends in the bracket arm and having a forked end straddling the valve rod beneath the nut on the upper end thereof.

5. In a soldering tool the combination of an electrically heated melting pot having a feed duct opening through its lower end, a cover plate removably closing the upper end of the pot and provided with a filler opening, a tubular guide projecting upwardly from the cover plate, a valve stem reciprocably guided in the guide and projecting above the upper end thereof, a valve carried by the lower end of the stem for seating engagement with the inner end of the feed duct, spring means in the guide normally retaining the valve seated, an adjusting nut threaded upon the upper end of the stem, a bracket arm projecting upwardly from the cover plate at one side of the tubular guide, a control lever pivotally mounted in the upper end of the bracket arm having a forked end for straddling the valve stem beneath the adjusting nut and having a downwardly offset rear end terminating in a thumb grip portion and a handle projecting laterally from the melting pot in substantially parallel relation beneath said thumb grip portion.

6. In a combination melting pot and soldering iron the combination of a melting pot having a feed duct opening through its lower end, a cover plate secured over the upper end of the pot to form a closed chamber and provided with a threaded filler opening, a removable closure plug for the filler opening, valve control means for opening and closing the feed duct, a heating unit for the pot, and means for connecting an air pressure line in said filler opening upon removal of the closure plug to form a head pressure in the chamber above the solder.

STEPHEN BARACATE.